No. 684,338. Patented Oct. 8, 1901.
H. J. GILLE.
SYSTEM OF ELECTRICAL DISTRIBUTION.
(Application filed Nov. 15, 1900.)
(No Model.)
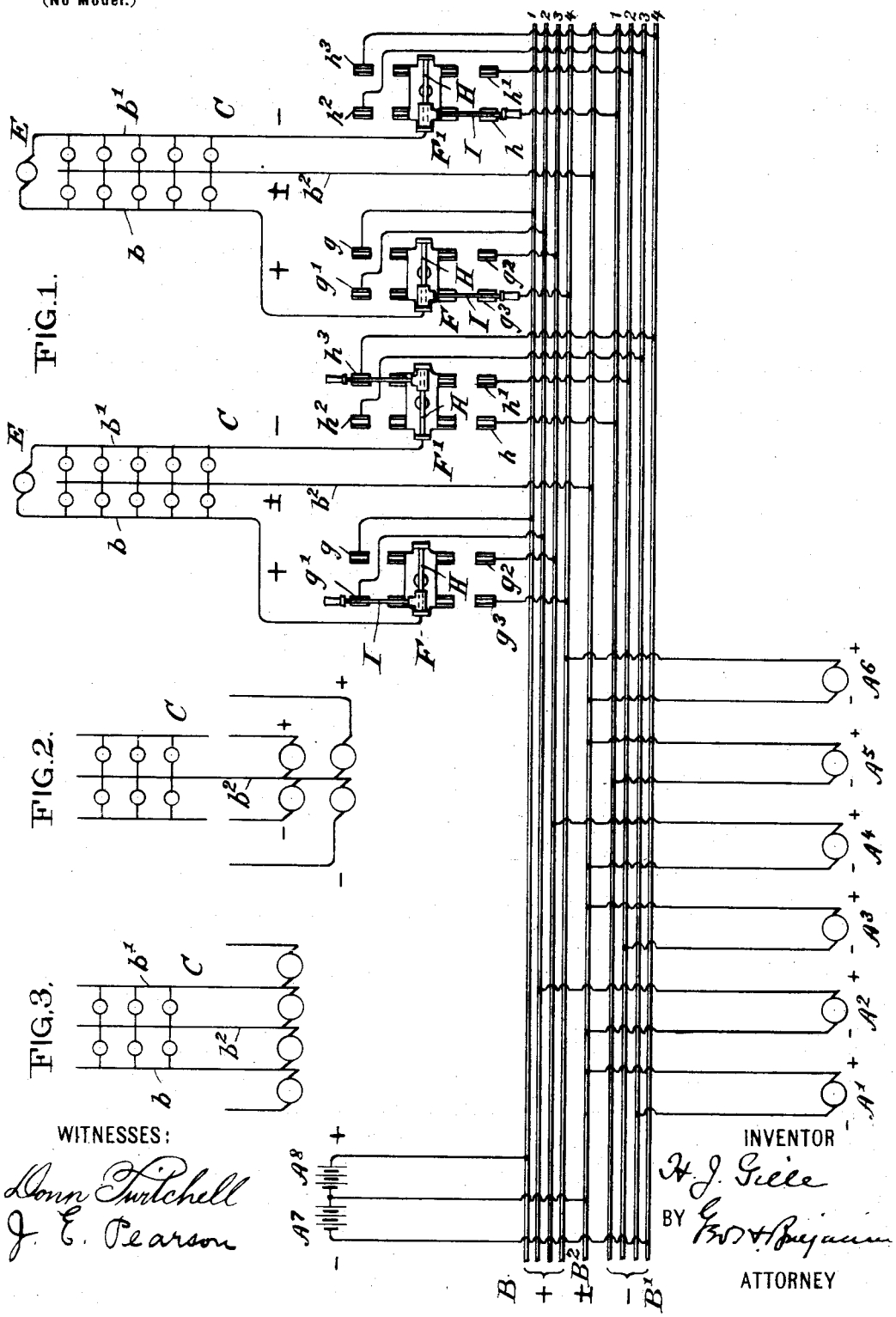
WITNESSES:
Donn Twitchell
J. E. Pearson
INVENTOR
H. J. Gille
BY Geo. H. Benjamin
ATTORNEY

UNITED STATES PATENT OFFICE.

HENRY JOHN GILLE, OF ST. PAUL, MINNESOTA, ASSIGNOR OF ONE-HALF TO GENERAL INCANDESCENT ARC LIGHT COMPANY, OF NEW YORK, N. Y.

SYSTEM OF ELECTRICAL DISTRIBUTION.

SPECIFICATION forming part of Letters Patent No. 684,338, dated October 8, 1901.

Application filed November 15, 1900. Serial No. 36,592. (No model.)

*To all whom it may concern:*

Be it known that I, HENRY JOHN GILLE, a citizen of the United States, residing at St. Paul, county of Ramsey, State of Minnesota, have invented certain new and useful Improvements in Systems of Electrical Distribution, of which the following is a specification.

In United States Letters Patent No. 274,290, issued to Thomas A. Edison, of Menlo Park, New Jersey, on March 20, 1883, there is described a system of electrical distribution involving the employment of a divided source of electrical energy, a number of conductors leading therefrom, a number of translating devices arranged in multiple arc between pairs of the conductors and in series with each other, and one or more compensating conductors carried back to the points of division of the source of energy, the number of compensating conductors depending upon the number of translating devices and number of divisions in the source of energy in series—as, for instance, with three conductors and two translating devices in series and a single division in the source of energy one compensating conductor, with four wires three translating devices, and two divisions in the source of energy two compensating conductors, this system being now generally known in the art as the "Edison three-wire system of electrical distribution."

My improved system of electrical distribution comprehends the general features of the Edison three-wire system, with the difference that whereas in the Edison system the compensating conductors of each translation-circuit, formed of three wires where there is a number, are brought back independently to divided sources of energy. In my system all of such compensating conductors are brought back and connected to a single conductor, which is connected to all the sources of energy at their points of division. In other words, assuming that there are two three-wire circuits, in the Edison system there would be four generators, pairs of which would be connected in series with a compensating conductor connected between the generators of each pair. In my system the compensating conductors would be connected to a single conductor, which may be termed the "main neutral or compensating conductor," and this conductor connected to each pair of generators (there may be two, three, or more) at the point of division between each pair of generators, the object of this arrangement being to obtain greater flexibility in the system as a whole than is possible where each translation-circuit is dependent upon individual divided sources of energy.

The accompanying drawings will serve to illustrate my invention, in which—

Figure 1 is a diagram illustrating an organization of an apparatus and circuits adapted to carry out the invention. Fig. 2 is a diagram illustrating the manner in which either of two independent divided sources of energy may be connected to a three-wire translation-circuit through a single compensating conductor. Fig. 3 is a diagram illustrating a plan of circuit connections for the Edison three-wire system with two divided sources of energy in series.

Similar letters of reference indicate like parts.

In the drawings, $A'$ $A^2$ $A^3$ $A^4$ $A^5$ $A^6$ $A^7$ $A^8$ represent dynamo-electric machines, motor-generators, storage batteries, or other sources of electric energy; $B$ $B'$ $B^2$, station bus-bars. Those marked B (1 2 3 4) may be considered the plus (+) bars, those marked $B'$ (1 2 3 4) the minus (−) bars, and that marked $B^2$ the neutral (±) bar. The number of plus and minus bus-bars will depend upon the number of sources of energy employed. For instance, in the present case there are shown eight sources of energy, or four divided sources of energy, and each divided source of energy consisting of two generators or storage batteries. The pairs of generators or storage batteries connected through one terminal—for instance, the plus terminal—of one generator or storage battery to one of the plus bus-bars, and the other terminal—for instance, the minus terminal—of the second generator or storage battery to one of the minus bus-bars, and the neutral point between the generators or pairs of storage batteries connected to the neutral bus-bar. In other words, each divided source of energy $A'$ $A^2$ $A^3$ $A^4$ $A^5$ $A^6$ $A^7$ $A^8$ is connected at its neutral point to the neutral bus-bar; but one neutral bus-bar is used irrespective of the number of divided sources of energy employed in the system.

C C represent three-wire translation-circuits, of which there are two, each circuit having a number of lamps or other translating devices arranged in multiple series across the external conductors $b$ $b'$ or in multiple arc of one external conductor and the compensating conductor $b^2$.

E represents motors or other similar translating devices connected in multiple arc with the distributing-conductors $b$ $b'$. The conductors $b$ $b'$ of the distributing-circuit are respectively connected to the switches F F'. These switches are of special construction and are arranged to coact with the contacts $g$ $g'$ $g^2$ $g^3$ of the switch F and $h$ $h'$ $h^2$ $h^3$ of the switch F', which contacts are respectively connected, those marked $g$ $g'$ $g^2$ $g^3$ in successive order to the plus bus-bars B (1 2 3 4) and those marked $h$ in successive order to the minus bus-bars B', (1 2 3 4.) The switches F and F' are of peculiar construction and consist, essentially, of a horizontally-disposed rod H, on which is mounted to slide horizontally a switch-lever I. It will be readily understood that by means of the switch-levers of the switch F all of the plus bus-bars may be individually connected to the translation-circuit conductor $b$, and by means of the switch-lever I of the switch F' all of the minus plus-bars may be individually connected to the translation-circuit conductor $b'$.

From the foregoing description it will be apparent that any one of the divided sources of energy may be connected at will to either one of the translation-circuits C—for instance, with the switch-lever I in the position shown at the left of the translation-circuit—that is, coacting with the contacts $g'$ on one side and $h^2$ upon the opposite side—the divided sources of energy represented by the generators $A^2$ $A'$ would be connected to this translation-circuit, or with the switch-levers in the position shown at the right of the translation-circuit—that is, with the switch-levers coacting with the contacts $g$ and $h^3$—the divided sources of energy represented by the storage batteries $A^8$ $A^7$ would be connected to this translation-circuit. By following out the circuit connections it will be observed, as before stated, that any one of the divided sources of energy can be connected with either of the translation-circuits. Manifestly a further number of divided sources of energy or translation-circuits could be connected without in any wise altering the general arrangement of the system as a whole.

By reference to Fig. 2 it will be observed that each divided source of energy formed of two generators or storage batteries is connected to the same neutral conductor, whereas in the Edison system, (illustrated in Fig. 3,) where the number of divided sources of energy is increased, there is a consequent increase in the number of neutral conductors. There is the further difference that in my improved system the neutral conductor always remains the neutral conductor, irrespective of the number of divided sources of energy employed, whereas in the Edison system, for instance, two divided sources of energy are coupled in series the neutral conductor $b^2$ of a single divided source of energy becomes an external conductor of each divided source of energy.

The general arrangement of the parts as described in my improved system permits of the connection of but one divided source of energy to each translation-circuit. Manifestly, however, through the interposition of suitable switches common in the art it would be possible to connect two divided sources of energy in multiple arc with the conductors of a translation-circuit, and yet employ but a single neutral conductor connecting the neutral point of the divided sources of energy, as in Fig. 2. Further, it would be possible to make further circuit connections through the interposition of suitable switches, as in the case where the translation-circuit consisted of more than two lamps in series, in which case the neutral conductors of the translation-circuit would be carried back to the main neutral bus-bar $B^2$.

Having thus described my invention, I claim—

1. A system of electrical distribution having in combination the following elements, a number of sources of electrical energy, a series of bus-bars of uniform potential each connected to one pole of one source of energy, a neutral bus-bar connected with the remaining pole of each source of energy, one or more three-wire translation-circuits, the neutral conductor of which is connected to the neutral bus-bar, and means for connecting the external conductors of said translation circuit or circuits respectively with pairs of said bus-bars.

2. A system of electrical distribution having in combination the following elements, a number of sources of electrical energy, a series of bus-bars of uniform potential each connected to one pole of one source of energy, a neutral bus-bar connected with the remaining pole of each source of energy, one or more three-wire translation-circuits, the neutral conductor of which is connected to the neutral bus-bar, means for connecting the external conductors of said translation circuit or circuits respectively with pairs of said bus-bars, and translating devices arranged in multiple series in said translation-circuits.

3. A system of electrical distribution having in combination the following elements, a number of sources of electrical energy, a series of bus-bars of uniform potential each connected to one pole of one source of energy, a neutral bus-bar connected with the remaining pole of each source of energy, one or more three-wire translation-circuits, the neutral conductor of which is connected to the neutral bus-bar, means for connecting the external conductors of said translation circuit or circuits respectively with pairs of said bus-bars, translating devices arranged in multiple series in said translation-circuits, and translating devices arranged in multiple of the external conductors of said translation-circuits.

In testimony whereof I affix my signature in the presence of two witnesses.

HENRY JOHN GILLE.

Witnesses:
 CONSTAN JENSEN,
 A. P. LATHROP.